UNITED STATES PATENT OFFICE.

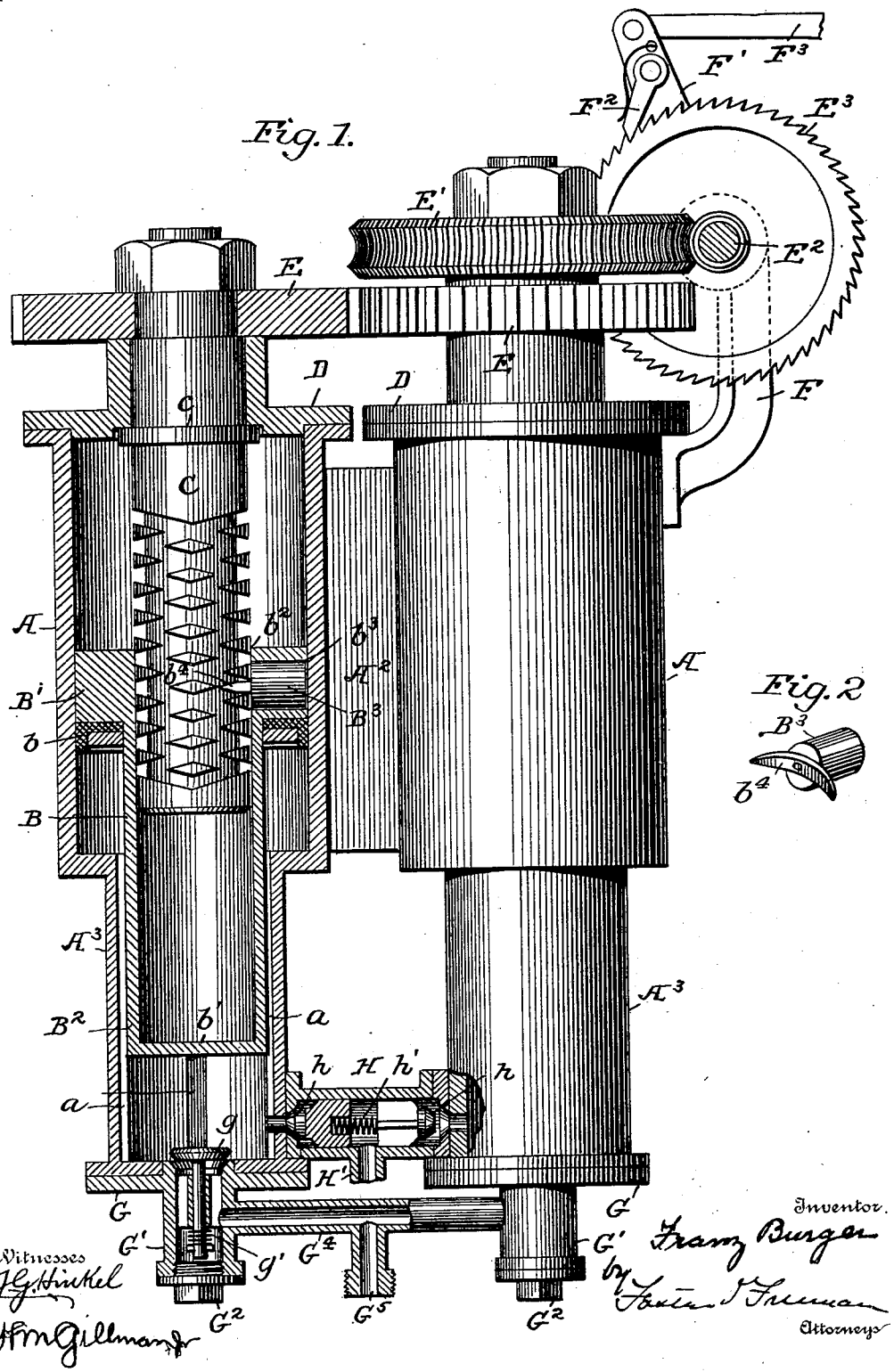

FRANZ BURGER, OF FORT WAYNE, INDIANA, ASSIGNOR OF THREE-FOURTHS TO HENRY M. WILLIAMS, OF SAME PLACE.

LUBRICATOR.

SPECIFICATION forming part of Letters Patent No. 669,195, dated March 5, 1901.

Application filed March 24, 1900. Serial No. 10,088. (No model.)

*To all whom it may concern:*

Be it known that I, FRANZ BURGER, a citizen of the United States, residing at Fort Wayne, county of Allen, and State of Indiana, have invented certain new and useful Improvements in Lubricators, of which the following is a specification.

My invention relates to a continuous positive-feed lubricator, and has for its object to improve and simplify the construction of such devices; and the invention consists in a lubricator embodying the various features of construction and arrangement having the general mode of operation, substantially as hereinafter more particularly set forth.

Referring to the accompanying drawings, wherein I have shown a preferred embodiment of the invention, Figure 1 is a side view, partly in section, showing the construction of the device. Fig. 2 is a perspective view of the automatically-operating device which connects the piston to the feed-screw.

In the operation of various machines it is desirable to provide means for supplying a definite amount of lubricant and to supply it positively and continuously during operation. Many lubricators have been suggested depending upon the use of steam, and while these have proved satisfactory in some cases there are instances, such as in connection with the use of locomotives and other like operating machines, when the machine is operated without direct application of steam—as, for instance, in running downgrades or operating through momentum or otherwise—and the so-called "sight-feed" lubricators fail to supply the proper lubrication at such times. With my construction each and every movement of the part to be lubricated insures a proper lubrication, the lubricant being continuously under pressure, which pressure depends upon the movements of the parts to be lubricated or some parts connected therewith and not upon the power by which the movements are effected. My invention therefore comprises a lubricator which can be arranged in any convenient relation, preferably in the vicinity of the parts to be lubricated, and which is so connected with the operating parts of the machine or engine that at each or any other desired movement the parts will receive a predetermined amount of lubricant.

Referring to the accompanying drawings, it will be seen that my device comprises practically two complementary parts or cylinders, one being shown in side view and the other in section, and these are connected so as to operate conjointly to continuously furnish a supply of lubricant. Moreover, the lubricant is under pressure at all times and of course can be forced against steam-pressure—as, for instance, in the lubrication of cylinders of engines and the like. By means of suitable pipes (not shown) any moving parts of the engine or machine may be properly lubricated. Thus A A' represent two cylinders mounted parallel to each other on a suitable support, as the plate $A^2$, and while these cylinders may be of any desired shape they are preferably provided with reduced extensions $A^3$. Mounted in each of the cylinders is a piston B, which in the form shown is of two diameters, the portion B' being adapted to fit the main cylinder A and the portion $B^2$ being adapted to fit the cylinder extension $A^3$ and act as a guide for B'. One or both of these portions of the piston are provided with some sort of packing, and in the present instance I have shown the portion B' as being provided with a cup-shaped packing b, while the portion $B^2$ fits in the cylinder extension $A^3$, provision being made to allow the fluid or lubricant to pass between its outer side and the inner surface of the cylinder extension. In practice I prefer to provide the cylinder extension $A^3$ with a number of longitudinal grooves a, through which communication is established between the main cylinder and the cylinder extension. The piston B is hollow, being closed at its lower end, as at b', with its upper end $b^2$ open, and it serves to receive the means for moving the piston in the cylinder, which means in the present instance comprises the right and left hand screw-threaded plug C. The construction of this screw-threaded plug is well understood. The threads cross each other and unite with each other at the end, and arranged in connection with the piston is some means for connecting the piston with the plug so that they will move with proper relation to each other. In the present instance the portion B' of the piston is cross-bored at $b^3$, in which is fitted a rod $B^3$, having on its face or inner end a crescent-shaped piece $b^4$, adapted to engage the threads of the plug C. This piece is pivoted or swiveled to the rod $B^3$ and travels in the threads in a manner well understood, and when it reaches the end of the threads, where the right and left hand threads unite, it passes from one to the other, so as to reverse the relative movements between the plug and piston.

Some means must be provided for supporting the plug, and in the present instance the cylinder-head D not only closes the cylinder, but furnishes a bearing for the plug, it preferably being provided with an enlargement $c$, fitting a recess in the inner portion of the head. Some suitable means must be used for operating the plug, and while this may vary I have shown a gear-wheel E, mounted on the end of the plug, which engages with a similar gear-wheel on the plug of the adjacent cylinder, so that the plugs will be operated with proper relation to each other. Attached to one of the plugs in the present instance is a worm-wheel E', engaging a worm on a worm-shaft $E^2$, and on this shaft is mounted a ratchet-wheel $E^3$. This shaft is supported in any suitable way, as by a bracket F, and in the present instance attached to the cylinder and suitably supported on the worm-shaft or otherwise is an arm F', carrying a dog or pawl $F^2$, engaging the ratchet-wheel, and this arm is operated in any suitable way from any moving part of the machine or engine, as by means of a connecting-rod $F^3$, so that its movements will be timed in relation to the movements of the parts to be lubricated.

The lower ends of the cylinders A A' are closed by suitable heads G, which in the present instance are provided with hollow extensions G', preferably closed by plugs $G^2$, and these extensions are connected by a pipe $G^4$, having a nozzle $G^5$, by means of which connection may be made with a suitable source of supply of the lubricant. Between this pipe and the cylinders there should be a suitable valve, and I have shown a suction-valve $g$, normally under the stress of a spring $g'$, which tends to close the valve, but which permits it to be opened to allow the lubricant to flow into the cylinders.

The cylinders are provided with some sort of connections to deliver the lubricant to the place or places desired, and in the present instance I have shown the cylinders as united by a tube H, having a delivery-nozzle H' and provided with valves $h$, which in the present instance are under the stress of a spring $h'$, tending to close them, but which permits either one or the other to yield to allow the lubricant to pass from the one or the other cylinder through the delivery-nozzle H'.

Such being the preferred construction of my device, its operation will readily be understood. Motion being imparted to the plugs, one will rotate in a direction to move its corresponding piston upward, while the other piston will move downward at a corresponding rate of speed. The piston moving upward will draw a supply of lubricant through the nozzle $G^5$, pipe $G^4$, by the valve $g$ into the cylinder until the piston reaches the limit of its stroke, when the crescent-shaped piece $b^4$ will cause the reversal of the direction of movement of the plug and the piston will travel downward, closing the valve $g$ and forcing the lubricant through the valve $h$ out of the delivery-nozzle H'. Meanwhile the piston in the other cylinder is operating in the same way, except that its movements are so timed that when one piston is being filled with lubricant the other is discharging the lubricant, and vice versa. In this way it will be seen that there is a constant feed under pressure of the lubricant, the amount of feed being determined by the relative movements of the parts being supplied with lubricant.

The whole construction of the device is simple and not liable to get out of order and is practically automatic in its operation.

What I claim is—

1. A continuous, positive-feed lubricator, comprising two cylinders mounted parallel to each other and each provided with a reduced extension, a fluid-tight piston in each cylinder, an extension on each piston projecting into the reduced extension of its cylinder with a space between them to afford a fluid-passage from the extension to the cylinder, means for reciprocating said pistons simultaneously in opposite directions, automatically-operating means to reverse the movements of said pistons when they reach their limit of movement in either direction, and valve-controlled inlet and outlet openings in each extension, substantially as set forth.

2. A continuous, positive-feed lubricator, comprising two cylinders each provided with a reduced extension provided with longitudinal grooves, a piston in each cylinder each piston having an enlarged portion and a reduced portion, a screw-threaded plug in each piston, means connecting each plug with each piston, and automatically-operating means to reverse the movements of said pistons when they reach their limit of movement in either direction, and valve-controlled inlet and outlet openings in each extension, substantially as set forth.

3. A continuous, positive-feed lubricator, comprising two cylinders mounted parallel to each other and each provided with a reduced extension, a piston in each cylinder, an extension on each piston projecting into the reduced extension of its cylinder with a space between them to afford a fluid-passage from the extension to the cylinder, means for reciprocating said pistons simultaneously in opposite directions, automatically-operating means to reverse the movements of said pistons when they reach their limit of movement in either direction, valve-controlled inlet and outlet openings in each extension, a supply-pipe common to both inlet-openings, and a discharge-pipe with which both of said discharge-openings communicate, substantially as set forth.

In testimony whereof I have signed my name to this specification in the presence of two subscribing witnesses.

FRANZ BURGER.

Witnesses:
GEO. D. CRANE,
J. BURGER.